T. G. WALKER.
Peat Machine.
No. 66,428.
Patented July 2, 1867.
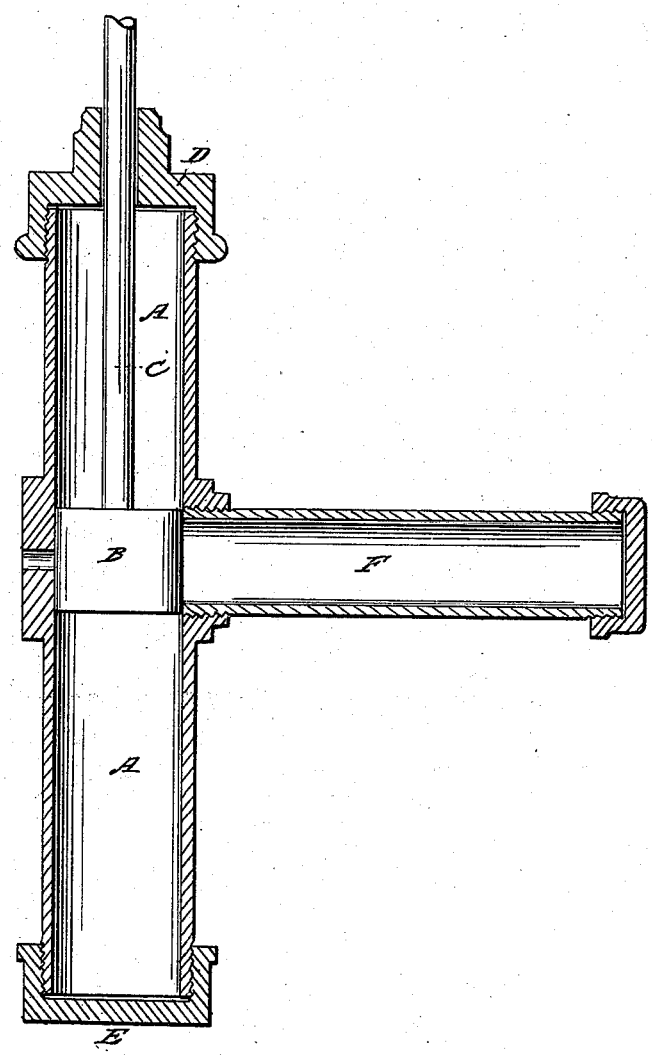

United States Patent Office.

THOMAS GEORGE WALKER, OF NEW YORK, N. Y.

Letters Patent No. 66,428, dated July 2, 1867.

---

IMPROVEMENT IN DRYING AND PREPARING PEAT.

---

The Schedule referred to in these Letters Patent and making part of the same.

---

TO ALL WHOM IT MAY CONCERN:

Be it known that I, THOMAS G. WALKER, of the city, county, and State of New York, have invented a new and useful Improvement in Separating Water and other Volatile Properties from Peat and other substances; and I do hereby declare that the following is a full, clear, and exact description thereof, which will enable others skilled in the art to make and use the same, reference being had to the accompanying drawings, forming part of this specification.

This invention has reference to the manner in which the article of peat or other substance may be prepared for use, and it consists in subjecting it to a high temperature in a retort or closed vessel, and then suddenly exposing it to a less pressure, whereby the water and volatile particles contained therein may readily escape and leave the peat in a suitable condition for pressing.

The drawing represents a rude apparatus by which to illustrate my general idea in regard to preparing peat, but I do not confine myself to this or any other particular method of carrying out my invention.

A is a simple cylinder provided with a piston, B, and piston-rod c, with a removable cap, D, upon one end, and with a stuffing-box, E, surrounding the piston-rod at the other end. Near its middle it is connected with a branch pipe, F. This branch has a removable cap over its end, the other end being connected with the cylinder and in communication with it. This branch pipe F may represent a retort which may be filled with fresh peat or other substance. The communication with the cylinder would be cut off by the piston B, as represented, when the peat in F would be subjected to a high temperature or to any required degree of heat above the boiling point. When the desired temperature is reached, the piston is drawn back, thus opening the communication between the retort and the cylinder. The pressure in the retort will force the contents into the cylinder, while the contained vapor will escape through an aperture or apertures in the cylinder, as seen at a. The piston is now forced forward, and the contained peat is pressed in the end of the cylinder. When the cap D is removed, the block of peat is easily taken from the cylinder.

I do not confine myself to the preparing of peat alone by my process. All other articles or substances from which it may be desired to extract the watery or volatile particles I propose to treat by this process. In this or in a similar manner I propose to carry out my invention. I do not confine myself to any particular arrangement for that purpose. As before stated, my invention consists in the process or manner in which I treat the peat or other substances and not in the apparatus.

Having thus described my invention, what I claim as new, and desire to secure by Letters Patent, is—

Subjecting peat and other substances (when confined in a closed retort) to a high degree of heat, or to any requisite temperature, and then opening a communication between the retort and another vessel, the interior of which other vessel being either under a lower pressure than the retort or a vacuum, and from such vessels allowing the vapors and volatile portions to escape, substantially as described.

The above specification of my invention signed by me this 20th day of March, 1867.

THOS. GEO. WALKER.

Witnesses:
ALEX. F. ROBERTS,
J. M. COVINGTON.